United States Patent [19]
Abowitz et al.

[11] Patent Number: 5,254,196
[45] Date of Patent: * Oct. 19, 1993

[54] SECURITY OF NEGOTIABLE INSTRUMENTS THRU THE APPLICATION OF COLOR TO XEROGRAPHIC IMAGES

[75] Inventors: Gerald Abowitz, Penfield; Raphael F. Boy, Jr., Pittsford; Paul W. Eakin, Webster; Wayne R. Smith, Pittsford, all of N.Y.

[73] Assignee: Xerox Corporation, Stamford, Conn.

[*] Notice: The portion of the term of this patent subsequent to Jan. 21, 2009 has been disclaimed.

[21] Appl. No.: 630,901

[22] Filed: Dec. 20, 1990

[51] Int. Cl.⁵ .............................................. B41M 5/26
[52] U.S. Cl. ................................... 156/235; 156/240; 430/106.6; 430/42
[58] Field of Search ............... 156/230, 234, 238, 240, 156/235; 430/106.6, 42; 235/488; 355/200, 245; 118/202, 204; 346/74.2

[56] References Cited

U.S. PATENT DOCUMENTS

| | | | |
|---|---|---|---|
| 3,833,395 | 9/1974 | Gosnell | 156/234 |
| 4,600,669 | 7/1986 | Ng et al. | 430/42 |
| 4,859,550 | 8/1989 | Gruber et al. | 430/106.6 |
| 5,083,157 | 1/1992 | Smith et al. | 355/200 |

FOREIGN PATENT DOCUMENTS 2-120765  5/1990  Japan ................................ 430/42

Primary Examiner—Jill L. Heitbrink

[57] ABSTRACT

A fraud prevention system for magnetic ink character recognition includes providing a colored, highly reflective media and magnetic media over a non-magnetic toned image which can be an on-line or off-line component of an imaging apparatus. Colored media and magnetic ink are applied to selected characters from a thin film that includes a layer of colored media and a layer of magnetic media by utilizing a heater member to promote release of the colored and magnetic media to the previously toned characters.

6 Claims, 2 Drawing Sheets

SECURITY OF NEGOTIABLE INSTRUMENTS THRU THE APPLICATION OF COLOR TO XEROGRAPHIC IMAGES

Copending and commonly assigned U.S. application Ser. No. 630,907 by Wayne R. Smith et al. filed Dec. 20, 1990 and now U.S. Pat. No. 5,083,157 and entitled Application of MICR Media to Xerographic Images is hereby cross-referenced and incorporated herein by reference.

The present invention relates generally to an electrophotographic printing machine, and more particularly concerns an apparatus for the application of colored magnetic ink character recognition media to previously toned xerographic images for security purposes.

In general, the process of electrophotographic printing includes charging a photoconductive member to a substantially uniform potential to sensitize the surface thereof. The charged portion of the photoconductive surface is exposed to a modulated light beam, i.e., a laser beam, may be utilized to discharge selected portions of the charged photoconductive surface to record the desired information thereon. In this way, an electrostatic latent image is recorded on the photoconductive surface which corresponds to the electrostatic latent image on the photoconductive member, the latent image is developed by bringing developer material into contact therewith. Generally, developer material is comprised of toner particles adhering triboelectrically to carrier granules. The carrier granules are magnetic with the toner particles may or may not contain small amounts of magnetic media encapsulated in thermoplastic resin binder. The toner particles are electrostatically attracted from the carrier granules to a copy sheet. Alternatively, single component development can be used. Finally, the copy sheet is heated to permanently affix toner image to the copy sheet.

Electrophotographic printing has been particularly useful in the commercial banking industry by reproducing checks or financial documents with magnetic ink, i.e., by fusing magnetically loaded toner particles thereon. Each financial document has imprinted thereon encoded data in a magnetic ink character recognition (MICR) format. In addition, high speed processing of financial documents is simplified by imprinting magnetic ink bar codes in machine readable form thereon. The repeated processing of the financial documents and the high speed sorting thereof is greatly simplified by the reading of the encoded data by a MICR reader. Thus, encoded information on financial documents may be imprinted thereon with magnetic ink or toner. The information reproduced on the copy sheet with the magnetic particles may be subsequently read due to its magnetic characteristics. Hereinbefore, high speed electrophotographic printing machines have employed magnetic toner particles to develop the latent image. These toner particles have been subsequently transferred to the copy sheet and fused thereto. The resultant document may have the magnetic data imprinted thereon in MICR readable format which is subsequently read by a MICR reader and processed. Thus, while the utilization of magnetically encoded information on documents reproduced with magnetic particles is well known, the cost of using magnetic toner as the only developer in a printer is substantial since every copy going through the printer uses up magnetic toner whether the subsequent copy is to be read by a MICR reader or not. Therefore, ways are needed to reduce this cost since techniques already advanced are not entirely satisfactory.

For example, U.S. Pat. No. 4,901,114 discloses a MICR toner used in combination with a Non-MICR toner. The combination of using MICR toner and standard toner enables one to print some parts of an image with MICR toner and the remainder with non-MICR toner. A heat sensitive magnetic transfer element for printing a magnetic image is disclosed in U.S. Pat. No. 4,581,283. The magnetic transfer element includes a heat resisting foundation and a heat sensitive transferring layer. A means of transferring a magnetic image to a substrate is also shown. U.S. Pat. No. 4,891,240 discloses a magnetic ink recognition coating system. The coating system includes means to provide a lubricant that is applied solely in the area where the MICR characters are printed. An electrophotographic printing machine is disclosed in U.S. Pat. No. 4,563,086 where a magnetic toner image is transferred to a copy sheet. Electrophotographic printing is used for reproducing checks or financial documents with magnetic ink by fusing magnetic toner particles thereon and U.S. Pat. No. 4,114,032 is directed to a method of manufacturing documents to prevent forgeries thereof. The method comprises producing a base material, coating fibers with a magnetic or magnetizable material, and embedding the fibers into the base material.

Once the MICR image has been added to a negotiable instrument there is still concern in the financial document processing industry for security of negotiable documents. The advent of desktop publishing and non-impact MICR printers has created a new opportunity for fraud in the industry. A practical means of security has been proposed that includes adding color or texture to, for example, a check or other negotiable instrument. However, the problem with this approach is that the color is easily reproduced on a color copier or scraped off by hand and replaced with a closely similar color. A technique that is much harder to forge is in U.S. Pat. No. 4,114,032 which discloses a method of manufacturing documents, such as, paper money, credit cards, identification cards and the like out of a fibrous material which is coated with magnetic or magnetizable material that is embedded in the binding agent. All of the above-mentioned patents are included herein by reference to the extent necessary to practice the present invention.

In accordance with the present invention, a fraud prevention technique is provided for use in an electrophotographic printing machine of the type in which a non-magnetic toner image is transferred to a copy sheet from a photoconductive member and fused thereto. Means are provided for the application of magnetic ink to the non-magnetic characters from a thin film comprising a highly reflective, colored magnetic media by utilizing a heater member to apply the magnetic ink to those characters of the copy sheet that are to be read by a magnetic ink character recognition reader or to characters selected by a machine operator.

The foregoing and other features of the instant invention will be more apparent from a further reading of the specification, claims and from the drawings in which:

Figure 1:
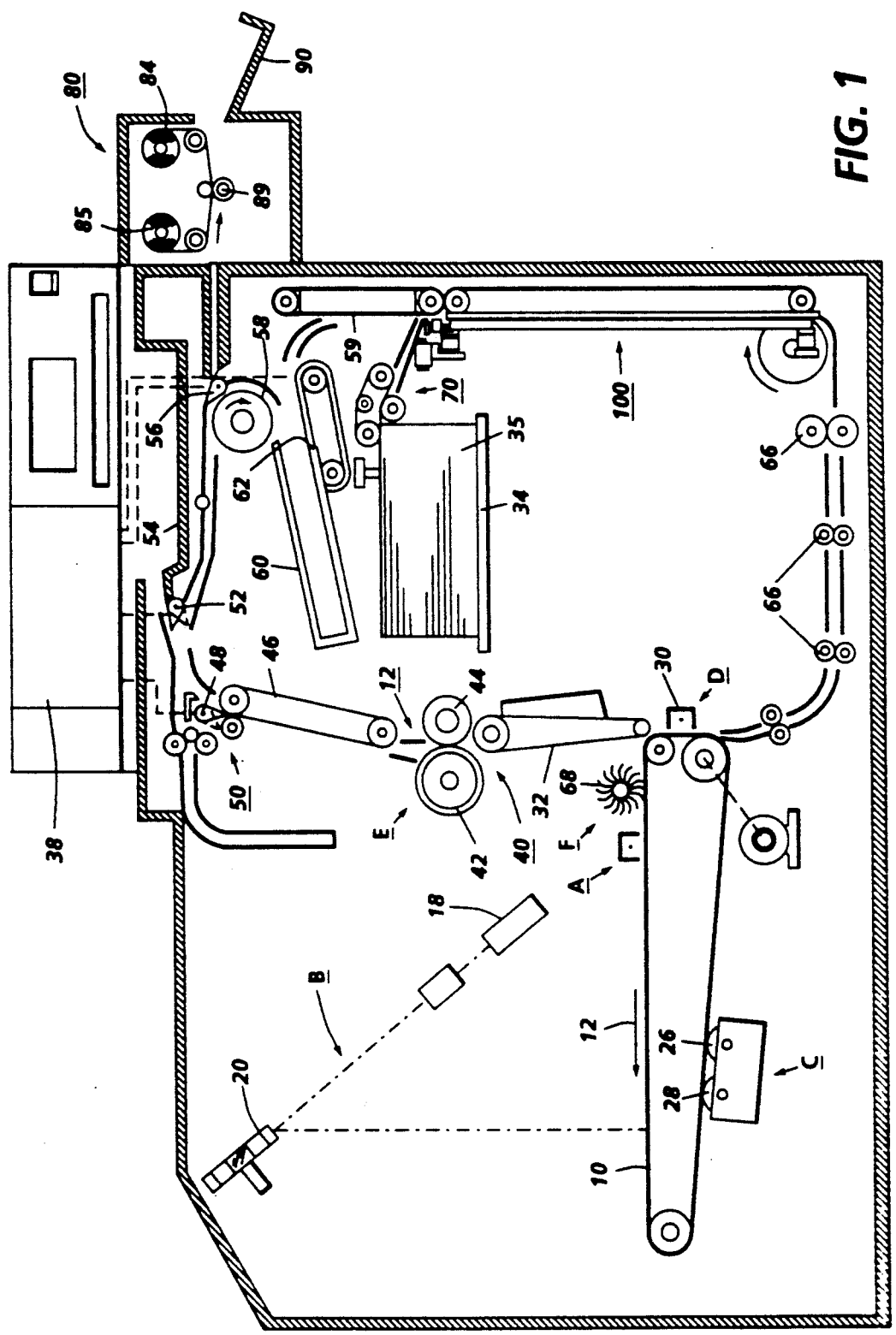
FIG. 1 is a schematic elevational view showing an electrophotographic copier employing the features of an aspect of the present invention.

For a general understanding of the features of the present invention, reference is had to the drawings. In the drawings, like reference numerals have been used throughout to designate identical elements. FIG. 1 schematically depicts the various components of an illustrative electrophotographic printing machine incorporating the improved method and apparatus for creating security for MICR readable images by applying colored, highly reflective magnetic media to non-magnetic toner in accordance with the present invention.

Inasmuch as the art of electrophotographic printing is well known, the various processing stations employed in the FIG. 1 printing machine will be shown hereinafter schematically and their operation described briefly with reference thereto.

As shown in FIG. 1, the illustrative electrophotographic printing machine employs a belt 10 having a photoconductive surface thereon. Preferably, the photoconductive surface is made from a selenium, but an organic photoconductive surface could be used, if desired. Belt 10 moves in the direction of arrow 12 to advance successive portions of the photoconductive surface through the various processing stations disposed about the path of movement thereof.

Initially, a portion of the photoconductive surface passes through charging station A. At charging station A, a corona generating device charges the photoconductive surface to a relatively high substantially uniform potential.

Next, the charged portion of the photoconductive surface is advanced through an electronic imaging station B. At imaging station B, a laser 18, on command from a computer and through polygon 20, images photoconductive surface 12 as disclosed in U.S. Pat. No. 4,782,363.

With continued reference to FIG. 1, at development station C, a pair of magnetic brush developer rollers, indicated generally by the reference numerals 26 and 28, advance a standard non-magnetic developer material into contact with the electrostatic latent image. The latent image attracts toner particles from the carrier granules of the developer material to form a toner powder image on the photoconductive surface of belt 10.

After the electrostatic latent image recorded on the photoconductive surface of belt 10 is developed, belt 10 advances the toner powder image to transfer station D. At transfer station D, a copy sheet is moved into contact with the toner powder image. Transfer station D includes a corona generating device 30 which sprays ions onto the backside of the copy sheet. This attracts the toner powder image from the photoconductive surface of belt 10 to the sheet. After transfer, conveyor 32 advances the sheet to fusing station E.

The copy sheets are fed from tray 34 to transfer station D. The tray senses the size of the copy sheets and sends an electrical signal indicative thereof to a microprocessor within controller 38.

Fusing station E includes a fuser assembly, indicated generally by the reference numeral 40, which permanently affixes the transferred powder image to the copy sheet. Preferably, fuser assembly 40 includes a heated fuser roller 42 and backup roller 44. The sheet passes between fuser roller 42 and backup roller 44 with the powder image contacting fuser roller 42. In this manner, the powder image is permanently affixed to the sheet.

After fusing, conveyor 46 transports the sheets past a magnetic media applicator 80 for selectively overcoating parts of the sheets and then to gate 48 which functions as an inverter selector. Depending upon the position of gate 48, the copy sheets will either be deflected into a sheet inverter 50 or bypass sheet inverter 50 and be fed directly onto a second decision gate 52. Thus, copy sheets which bypass inverter 50 turn a 90° corner in the sheet path before reaching gate 52. Gate 48 directs the sheets into a face up orientation so that the imaged side which has been transferred and fused is face up. If inverter path 50 is selected, the opposite is true, i.e., the last printed face is facedown. Second decision gate 52 deflects the sheet directly into an output tray 54 or deflects the sheet into a transport path which carries it on without inversion to a third decision gate 56. Gate 56 either passes the sheets directly on without inversion into the output path of the copier, or deflects the sheets into a duplex inverter roll transport 58. Inverting transport 58 inverts and stacks the sheets to be duplexed in a duplex tray 60 when gate 56 so directs. Duplex tray 60 provides intermediate or buffer storage for those sheets which have been printed on one side and on which an image will be subsequently printed on the side opposed thereto, i.e., the copy sheets being duplexed. Due to the sheet inverting by rollers 58, these buffer set sheets are stacked in duplex tray 60 facedown. They are stacked in duplex tray 60 on top of one another in the order in which they are copied.

In order to complete duplex copying, the previously simplexed sheets in tray 60 are fed to conveyor 59 seriatim by bottom feeder 62 back to transfer station D for transfer of the toner powder image to the opposed side of the sheet. Conveyors 100 and 66 advance the sheet along a path which produces an inversion thereof. However, inasmuch as the bottommost sheet is fed from duplex tray 60, the proper or clean side of the copy sheet is positioned in contact with belt 10 at transfer station D so that the toner powder image thereon is transferred thereto. The duplex sheets are then fed through the same path as the previously simplexed sheets to be stacked in tray 54 for subsequent removal by the printing machine operator.

Returning now to the operation of the printing machine, invariably after the copy sheet is separated from the photoconductive surface of belt 10, some residual particles remain adhering to belt 10. These residual particles are removed from the photoconductive surface thereof at cleaning station F. Cleaning station F includes a rotatably mounted fibrous brush 68 in contact with photoconductive surface of belt 10. These particles are cleaned from the photoconductive surface of belt 10 by the rotation of brush 68 in contact therewith. Subsequent to cleaning, a discharge lamp (not shown) floods the photoconductive surface with light to dissipate any residual electrostatic charge remaining thereon prior to the charging thereof for the next successive imaging cycle.

Figure 2:
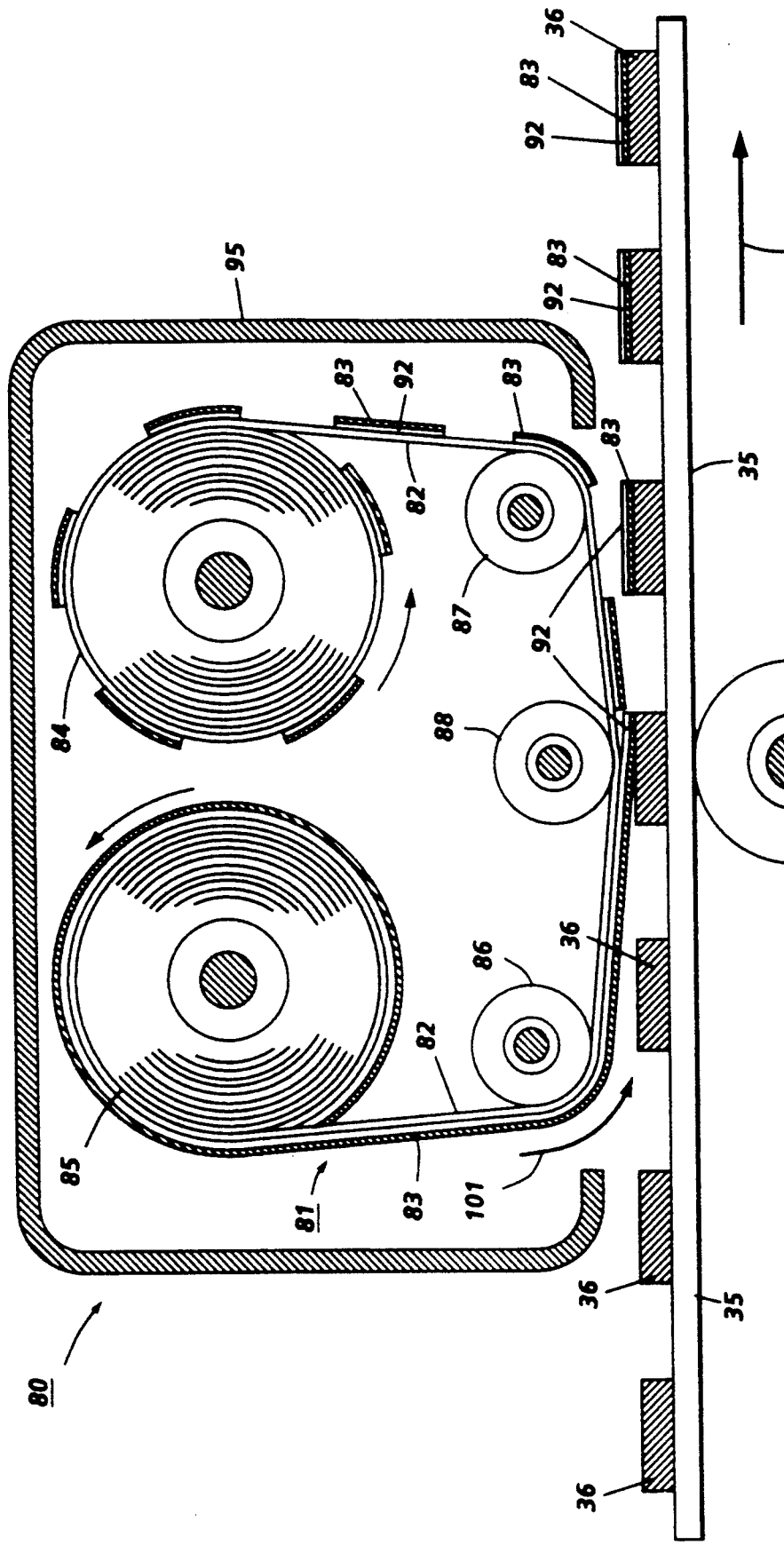
FIG. 2 shows a side view of the magnetizing device of the present invention employed in FIG. 1 in the process of placing a colored and magnetic overcoating onto non-magnetic toner as is part of the present invention.

Turning now to an aspect of the present invention, and in reference to FIGS. 1 and 2, media applicator 80 is positioned to apply colored and magnetic media to selected parts of sheets 35. When these sheets contain, for example, checks with four (4) on each sheet, the numbers or code along the bottom of any sheet are overcoated with a magnetic media as shown in FIG. 2 which makes the codes machine readable. The checks can now be passed through a machine called a reader-sorter by the bank processing any of the checks with the number and symbols now being recognizable. Colored and magnetic media can also be applied to other areas of the checks as will be discussed hereinbelow.

Media applicator 80 comprises a conventional fuser 88 mounted against the back of thin film 81. Film 81 comprises a heat resistant polyester film backing member 82, such as, Mylar with a highly reflective, colored layer 92 and a layer of magnetite 83 adhered thereto and is positioned to contact sheets deflected in its direction by gate 56. Any pigment dispersed in a resin could be used as the color layer, for example, for magenta, Hostaperm pink E (available from Hoechst Chemicals) in a resin like styrene could be used together with fine particles of a transition metal dispersed therein. The composition of a black magnetite layer 83 found to produce desired results preferably comprises iron oxide, carbon black, styrene, chlorinated rubber, mirasil and plastolein with each having a percent dried weight of 58.8, 6.4, 25.2, 7.3, 2.0 and 0.3, respectively. Film 81 is contained within a throw-away cassette 95 and wound up onto a pay-out spool 84 and connected to a take-up spool 85 at one end thereof after passing tensioning rollers 86 and 87, respectfully, with fuser 88 being positioned between the two spools 84 and 85 facing the backing member 82 and opposite a backup roller 89. Sheets 35 with the codes and symbols desired to be magnetized are located directly below fuser 88 which heats and presses film 81 against previously fused non-magnetic toner 36. The heat causes the magnetite and colored layer that is directly over standard toner characters to release from the backing member and adhere to the previously fused characters while the copy sheet continues en route toward output tray 90. It should be understood that this invention is also intended for use with a sensing system as disclosed in U.S. Pat. No. 4,891,240 where the code to be magnetized would be sensed, a circular heating shoe rotating at the speed of the copy sheets would be brought into contact with film 81 moving at the speed of the copy sheets and the shoe removed from the film once the code is sensed as having passed the media loading point.

It should be understood that multiple lines of coded material could be magnetized with the present magnetizing process by including multiple cassettes of tape positioned as desired. Further, while magnetic media applicator is disclosed herein as an on-line device, i.e., one that is connected to and accepts sheets from a copier/printer as they leave the copier/printer, one can readily see that the media applicator is adaptable to off-line use as well. In short, media applicator 80 is adaptable for both online and off line applications and provides colored magnetic ink character readable images on demand.

In practice, a printer add-on subsystem or standalone product 80 will selectively apply color using thermal transfer material 81 to some portion of, for example, a check, such as, a bank or corporate logo, amount of the check, payee of the check, etc. A highly reflective image results which has unique reflective characteristics making it very difficult to reproduce using color copier technology. In addition to the color, the high reflectivity of the color serves to increase the difficulty of fradulent document creation of tampering. Also, due to the highly reflective surface, checks made in this manner are fed past optical readers, microfilmers and image capture systems easily.

Any number of commercially available products can be used as a forgery prevention tool when preparing documents that do not have a MICR requirement. For example, material marketed by Letraset Corporation under the trade name Color Tag System could be used. Letraset markets a family of color transfer materials which transfer to heat absorbing images of the type resulting from non-impact printing systems. Application of hard-to-produce color will make it easier to differentiate between actual checks and forged look alikes in the check processing industry, and will also make it harder to change the content of areas so treated.

In recapitulation, it is evident that the apparatus and method of the present invention applies colored, highly reflective and magnetic media to non-magnetic toned images by heating one surface of a film containing layers of colored and magnetite material that is pressed onto the nonmagnetic toned image and only the desired image characters are magnetized resulting in a lower cost and highly efficient fraud prevention MICR system. Application of a hard to reproduce color to a document with the present invention will make it easy to differentiate between actual checks and forged look alikes, and will also make it harder to change the content of areas so treated through alterations.

It is therefore, apparent that there has been provided, in accordance with the present invention, an apparatus for applying a colored, highly reflective MICR readable media to xerographic images within a printing machine as a function thereof or as a stand alone apparatus. This apparatus fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to cover all such alternatives, modifications, and variations as fall within the spirit and broad scope of the appended claims.

What is claimed is:

1. A fraud prevention method to be used in creating MICR readable images out of previously fused non-magnetic images, comprising the steps of:
   providing a substrate containing non-magnetic images on a surface thereof;
   providing a film including a heat resistant backing member with colored, highly reflective media and a magnetite media adhered thereto; and
   providing a heater member positioned adjacent said backing member and adapted to contact and heat said backing member and press said colored media and magnetite media against predetermined portions of said non-magnetic images in order to fuse said colored, highly reflective media and said magnetic media onto said non-magnetic images and thereby render the resultant images readable by MICR readers and highly resistant to forgery.

2. The fraud prevention method of claim 1, including the step of providing toner images as said non-magnetic images on said substrate.

3. A method of providing fraud preventive MICR images, including the steps of:
   providing a substrate containing non-magnetic images on a surface thereof; and
   fusing a colored, highly reflective colored layer of material and a magnetite layer on top of said non-magnetic images.

4. The fraud prevention method of claim 3, including the step of providing toner images as said non-magnetic images on said substrate.

5. A method for creating fraud preventive MICR readable images out of previously fused non-magnetic images, comprising the steps of:

providing a substrate containing non-magnetic images on a surface thereof;

providing a film including a heat resistant backing member with separate layers of a colored, highly reflective media and a magnetite media adhered thereto; and providing a heater member positioned adjacent said backing member;

moving said substrate containing non-magnetic images on a surface thereof into contact with said backing member;

pressing said colored and magnetite media against predetermined portions of said non-magnetic images; and heating said colored and magnetite media with said heater member in order to thereby cause said magnetite media to fuse to said non-magnetic images and thereby render the resultant images readable by MICR readers and highly resistant to manual alterations.

6. The fraud prevention method of claim 5, including the step of providing toner images as said non-magnetic images on said substrate.

* * * * *